Jan. 19, 1960

W. C. WEBER ET AL 2,921,471

SENSITIVE ALTITUDE TRANSDUCER

Filed Jan. 5, 1955

INVENTORS
DONALD BERNARD HOFFMAN
WILLIAM C. WEBER

BY

ATTORNEYS

United States Patent Office 2,921,471
Patented Jan. 19, 1960

2,921,471

SENSITIVE ALTITUDE TRANSDUCER

William C. Weber, Perkasie, Pa., and Donald Bernard Hoffman, San Diego, Calif.

Application January 5, 1955, Serial No. 480,078

8 Claims. (Cl. 73—398)

(Granted under Title 35, U.S. Code (1952), sec. 266)

The invention described herein may be manufactured and used by or for the Government of the United States of America for governmental purposes without the payment of any royalties thereon or therefor.

This invention relates to a sensitive altimeter, more particularly, it relates to a sensitive altitude transducer of the type incorporating strain gages in a Wheatstone bridge arrangement for the measurement of pressure.

There are numerous applications in the field of aeronautics wherein it is essential to accurately control the altitude of airborne devices in the range from zero to about 1500 feet with an accuracy within one percent of the total range. Conventional altimeters are not sensitive enough within the above range due to a number of factors. The inherent friction caused by the gearing and mechanical assembly of conventional devices produces a sizeable error. When conventional altimeters are used as sensitive transducers the installation of a potentiometer on the shaft which actuates the needle is required. The resolution of the device is limited by the number of turns of the wire coil of the potentiometer and amplification results in amplification of the error. Also the potentiometer assemblies in themselves add another source of friction error. The accuracy of conventional altimeters under vibration is limited to forty or fifty feet at best, and if they are equipped with a potentiometer, to 150 or 200 feet. The potentiometer-altimeter system does not lend itself to the null balanced control system (autopilot). Further, conventional altimeters are subject to errors resulting from changes in environment temperature.

It is, therefore, an object of this invention to provide an altimeter sensitive to small changes in altitude within the range of zero to 1500 feet.

It is another object of this invention to provide a sensitive altitude transducer of the type incorporating a reference volume of fluid, in which the reference volume is completely sealed off.

It is still another object of this invention to provide a sensitive altitude transducer of the type incorporating a reference volume of fluid and in which the strain sensitive elements are resistances of a Wheatstone bridge, wherein the strain sensitive elements are not exposed to the reference volume fluid, and in which the bridge is fully temperature compensated.

The structure by which the above and other objects are accomplished is best understood by reference to the following description and the accompanying drawings, hereby made a part of this application, and in which, Fig. 1 is a vertical cross section of the altitude transducer of the invention;

Figure 1:
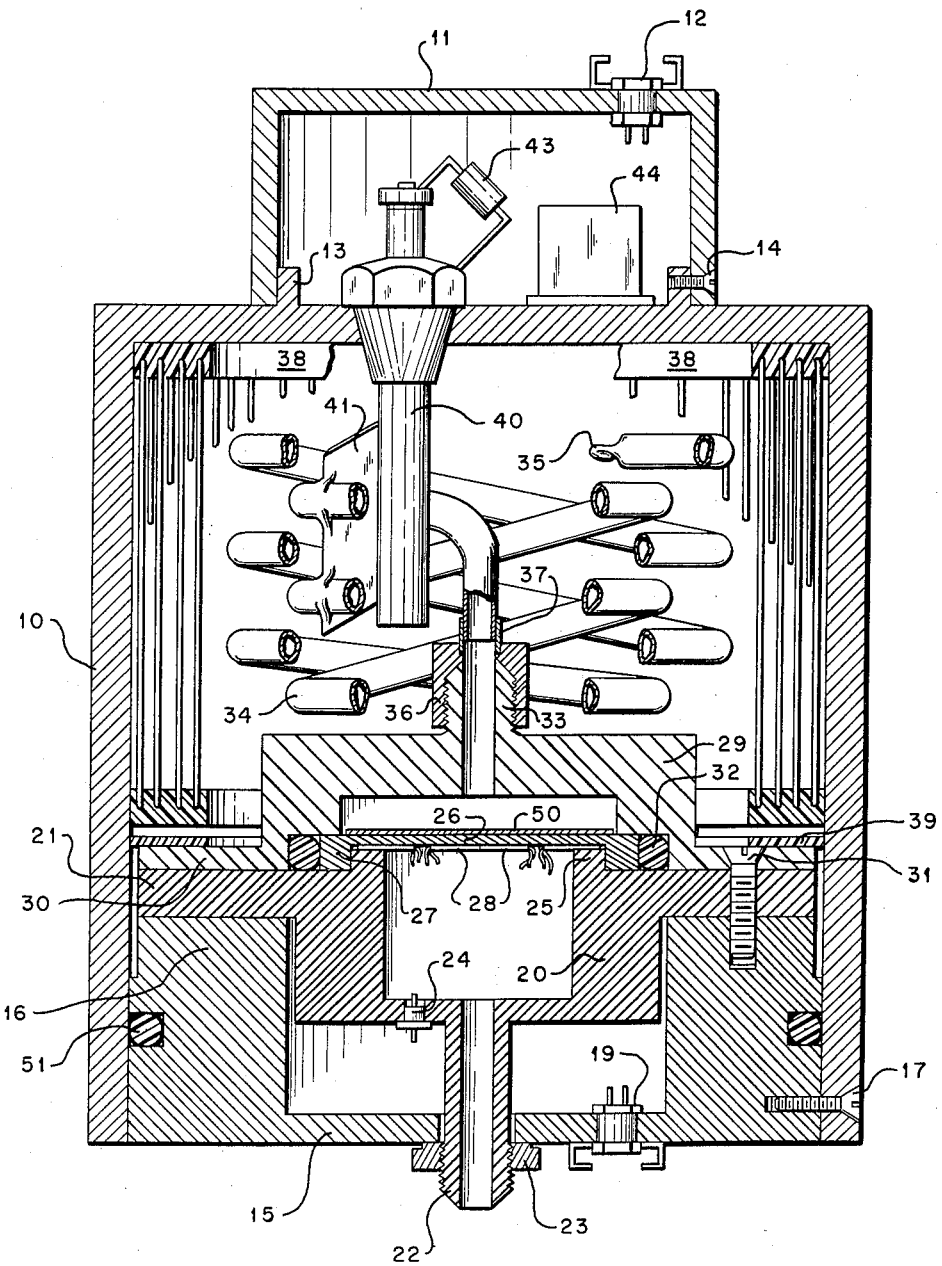

Referring to Fig. 1, the numeral 10 represents the outer circular case of the transducer made of aluminum or other suitable material. A circular cap 11 supporting Winchester plug 12 is mounted on top of the case 10 by means of ring 13 and screws 14. The removable cylindrical bottom section 15 of the case is cup shaped and is inserted in the case 10, as shown. It is secured in place by means of screws 17 or other convenient means and is provided with an opening in its center. Sealing O ring 51 is provided between outer case 10 and bottom section 15. Electrical plug 19 is mounted in the bottom of section 15, as shown. Diaphragm holder 20 is also cup shaped and is supported on the top of shoulder 16 by means of outwardly projecting annular rim 21, as shown. The bottom of the diaphragm holder 20 is provided with outlet tube 22 which is threaded, as shown, for attachment of nut 23. Glass bead insulating inserts 24 for attachment of strain gage leads are seated in the bottom of diaphragm holder 20. For receiving the diaphragm 26 in its mounted position, annular extension 25 is provided at the top of diaphragm holder 20.

The circular diaphragm 26 is of aluminum and is machined to a thickness of approximately .011 inch. It is made integral with rim 27. The diameter of the rim 27 is made slightly smaller than that of annular extension 25 so that when the diaphragm element is mounted in place with the rim 27 fitting over annular extension 25 the diaphragm 26 will be in a prestressed condition due to the slight interference fit. The prestressed condition enhances the stress sensitivity of the diaphragm. It also provides a greater restoring force to the zero position after the diaphragm has been deflected and tends to eliminate the "oil can" effect. The diaphragm is symmetrical with the vertical center line of the case and is held at right angles to the vertical center line by means of the diaphragm holder 20. The interior walls of the holder and the bottom of the diaphragm form an enclosure open to the atmosphere or pressure to be measured by outlet tube 22.

Figure 3:
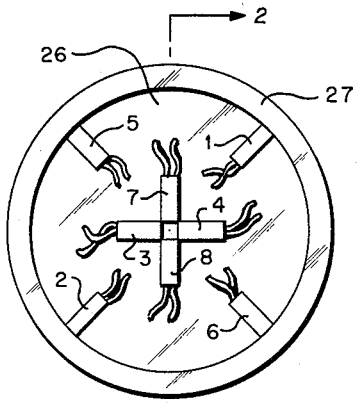
Fig. 3 is a plan view of the diaphragm surface upon which the stress sensitive elements are mounted, showing the positioning of the elements on the surface.

The stress sensitive elements or strain gages 28, numbered 1–8 in Fig. 3, are arranged on the face of the diaphragm at alternate areas of compression and tension as shown in Fig. 3 to permit measurement of both types of strain on one side of the diaphragm. The principle of this arrangement of strain elements is defined and explained in the copending application Serial No. 463,834, filed in the U.S. Patent Office, October 21, 1954, in the name of Donald B. Hoffman, now Patent No. 2,848,892, issued August 26, 1958. Diaphragm cap 29 is mounted in inverted position on diaphragm holder 20 with its annular flange 30 secured to rim 21 of the diaphragm holder 20 by means of screws 31, or other convenient means. To seal the enclosure between the top of diaphragm 26 and the bottom of diaphragm cap 29, O-ring 32 is inserted between rim 27 of the diaphragm and the inner surface of flange 30. The diaphragm cap 29 is provided with tubular extension 33 having threads on its outer surface, as shown. A protecting insulator 50, having an outer polished reflecting surface and a fabric covered surface adjacent the diaphragm is provided to protect the diaphragm from eddy currents in the air volume (hot spots on the diaphragm) which upset the bridge balance.

For containing a reference volume of a fluid, such as air, coiled tube 34 with multiple windings is provided. The tube is sealed at its free end 35. Its other end is sealed to tubular extension 33 by means of nipple 36 and sleeve 37. This construction provides a sealed compartment comprising the area above diaphragm 26 and the interior of the coiled tube 34. For controlling the temperature of the reference volume, a Nichrome heater 38 of circular construction is nested inside the outer case 10 so that it surrounds the coil 34. The heater is insulated at the bottom by dielectric insulating washer 39. A temperature responsive thermostat 40 is bonded to the coil sections by means of metal plate 41. The thermostat senses the temperature of the outside wall of the copper tube and is responsive to ½ degree change Fahrenheit in temperature. This thermostat controls the temperature of the reference volume of air by actuating the relay 44 which is in series with a 28 volt source (not shown) and the heater 38. To protect the thermostat from arcing, a small condenser 43 is connected across the thermostat contacts. For cutting in heater 38 which is responsive to thermostat 40, relay 44 is mounted on the top of outer case 10.

Figure 2:
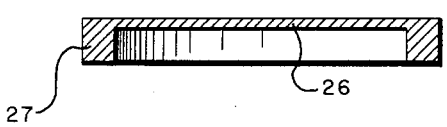
Fig. 2 is a cross section of the diaphragm element.

Fig. 2 shows the integral rim construction of the diaphragm. This construction is preferable to one in which the diaphragm edges are clamped into its supports, as this latter construction is conducive to errors resulting from slippage of the edges in the supports and the introduction of local strains at the clamped edge.

Referring to Fig. 3, the strain sensitive elements 1–8 are shown precisely located at alternate areas of tension and compression. Theory teaches that these areas are the most sensitive for strain measurements.

Figure 4:
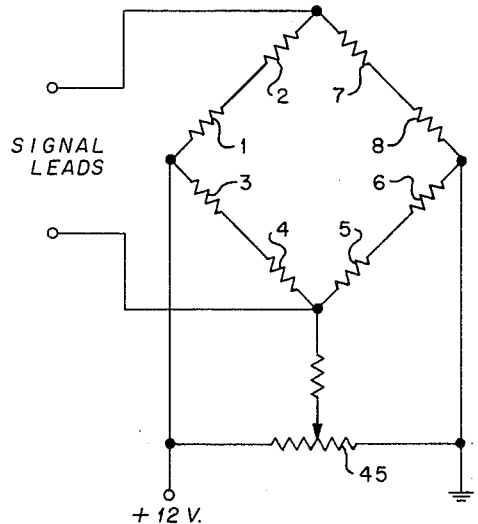
Fig. 4 is a schematic showing of the manner in which the strain gages are arranged to form the resistance arms of a Wheatstone bridge.

Referring to Fig. 4, the sensing elements 1–8 are connected as the resistances in a Wheatstone bridge circuit which incorporates balanced potentiometer 45. The conventional method of balancing strain gage bridges is used to provide a constant rate of altitude change (potentiometer driven by a constant speed motor) and compensation for changes in barometric pressure (potentiometer with calibrated card). The null output of the bridge can be varied by means of the balancing network to correspond to any altitude. Constant rate of change of the balancing network is the equivalent of shifting the null altitude (predetermined climbs and let downs).

Figure 5:
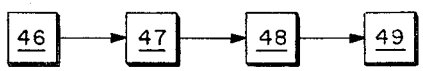
Fig. 5 is a block diagram illustrating the application of the invention to vary the flight path of aircraft or missiles in evasive action.

In Fig. 5, the numerals 46, 47, 48 and 49 represent a timing motor, a cam operated microswitch, a solenoid operated rotary wafer switch and the altitude transducer, respectively.

Figure 6:
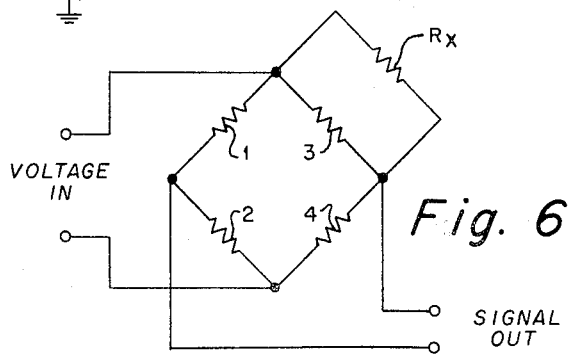
Fig. 6 is a schematic showing of the circuity by which predetermined resistors are shifted into a leg of the Wheatstone bridge to permit control of the aircraft altitude.

In Fig. 6, the resistances 1, 2, 3 and 4 of a Wheatston bridge circuit represent strain gages on the diaphragm of the transducer which is used to control an evasive action flight path. The numeral $R_x$ represents various resistors which may be used to shift the null position of the bridge to predetermined settings (altitudes).

In operation, the reference volume is maintained at a selected temperature by means of the thermostat 40 and the null point of the bridge is set. In responding to altitude changes the diaphragm senses changes in pressure between the atmosphere and the constant pressure reference volume of air contained in the area above diaphragm 26 and the interior of coiled tube 34. Changes in altitude with consequent changes in the pressure on the underside of diaphragm 26 will result in deflection of the diaphragm with resulting strain therein. This strain will be reflected in the bridge output due to change in resistance of the strain gages. The output signal can be telemetered, fed into an autopilot, or transferred as a reading on the pilot's dial. The electrical zero point of the bridge can be varied to correspond to any altitude.

Among the applications of the device are the following: an altitude control device to be used with an autopilot, permitting the altitude of an aircraft to be maintained or varied at predetermined rates; an altitude control device for guided missiles permitting the missile to be controlled at a given altitude or dived at predetermined rates of altitude loss on a target by radio control; an aid to blind flying enabling the pilot to maintain a given altitude (compensated for changes in barometric pressure) and set up predetermined rates of descent; a hovering control device for helicopters; a device to compensate for changing barometric pressure; a device for setting an evasive action flight path for a missile or drone. An arrangement permitting a predetermined evasive action flight path to be set for a missile or drone is illustrated by Figs. 5 and 6. The timing motor 46 drives a cam operated microswitch 47 which in turn pulses a solenoid operated rotary wafer switch 48 to place predetermined resistances $R_x$ across a leg of the bridge as indicated. The resistance arms of the bridge are strain gages on the sensing element of a transducer of this invention and are indicated by the numerals 1, 2, 3, and 4. The resistors are the equivalent of increments of altitude and cause the electrical zero position of the bridge to shift so that the corresponding error signals are fed to the autopilot.

The invention provides an altitude transducer having a sensitivity in the range of zero to 1500 feet with an error of not more than one percent of the total range. Among the structural features contributing to this sensitivity are: the integral construction of the thin diaphragm with its rim which eliminates the necessity of clamping the edges into a support with consequent probability of errors through slippage, and local strains; the prestressed condition in which the thin diaphragm is mounted makes it sensitive to strain and eliminates the "oil-can" effect in the diaphragm; the location of strain sensitive elements at alternate areas of tension and compression provides the maximum sensitivity to strain, effects cancellation of unwanted strains, and permits measurement of strain with all strain gages on one side of the diaphragm; the fact that all strain sensitive elements are located on one side of the diaphragm provides temperature compensation of the bridge; a coiled tube as an enclosure for the reference volume; direct contact between the temperature responsive element of the thermostat and the coiled tube provides a more effective temperature control of the reference volume.

Obviously, many modifications and variations of the present invention are possible in the light of the above teachings. It is, therefore, to be understood that within the scope of the appended claims the invention may be practiced otherwise than as specifically described.

What is claimed is:

1. A sensitive altitude transducer, comprising: a circular outer case; a cup shaped removable bottom section in said case having an opening in its central section and assembled in said case with its shoulder upward; a cup shaped diaphragm holder having an annular outer rim, an annular extension of its shoulder above the base of said outer rim, and a threaded outlet tube extending outwardly from its central section, said diaphragm holder positioned in said outer case with its shoulder upward and its annular outer rim resting on the shoulder of said removable bottom section so that said outlet tube extends through the opening in said bottom section; a circular diaphragm having an integral rim forming a cup shaped element with the diaphragm, the diaphragm being mounted with an interference fit on said diaphragm holder with its rim fitting over said annular extension, whereby a compartment open to the atmosphere is formed by the bottom of said diaphragm and the interior of said diaphragm holder; strain sensitive elements forming the resistance arms of a Wheatstone bridge securely bonded to the bottom surface of said diaphragm at alternate areas of tension and compression; a diaphragm cap having an annular flange extending outwardly from the top of its shoulder and an outlet tube extending outwardly from its center, said diaphragm cap being mounted in said outer case in an inverted position over said diaphragm with its annular flange secured to the annular rim of said diaphragm holder; sealing means between the outer surface of said diaphragm rim and the inner rim of the annular flange of said diaphragm cap; a tube coiled in multiple coils in said outer case above said diaphragm cap having its free end sealed and its other end attached to the end of the outlet tube of the diaphragm cap, whereby a sealed enclosure is formed of the area above said diaphragm and inside said coiled tube; a circular heating element between said coiled tube and the inner walls of said outer case; a thermostat extending through the top of said outer case bonded to the walls of said coiled tube by a metal bond; and means actuated by said thermostat for controlling the operation of said heating element.

2. A highly sensitive altimeter comprising, a sensing element supported by its edges and having its first side exposed to the atmosphere; strain sensitive elements mounted on said first side of said sensing element; means for indicating strain in said strain sensing element; means including a sealed hollow coil open to the other side of said sensing element and enclosing a reference volume of fluid; and means surrounding said coil for maintaining said reference volume of fluid uniformly throughout at a constant temperature.

3. A sensitive altitude transducer, comprising: a flat diaphragm member mounted in a prestressed condition, means exposing one side of said diaphragm to a fluid under a pressure to be determined; strain sensitive elements bonded to said diaphragm member; means including a sealed hollow coil open to the other side of said diaphragm member enclosing a reference fluid; means surrounding said coil for maintaining said reference fluid uniformly throughout at a constant, predetermined temperature; and means for indicating the strain in said strain sensitive elements in terms of the pressure of said fluid.

4. Highly sensitive pressure transducer apparatus comprising, in combination: diaphragm pressure sensing means; means subjecting said sensing means to a fluid pressure undergoing measurement; means also subjecting said sensing means to a reference pressure in opposition to said fluid pressure undergoing measurement, the latter said means comprising hollow coil means having sealed therein a reference fluid at said reference pressure; automatic controlled heating means for maintaining said reference fluid within said coil means at a predetermined constant temperature thereby insuring a constant reference pressure; strain sensitive elements mounted on said diaphragm sensing means; and means for indicating strain in said strain sensitive elements.

5. Highly sensitive pressure transducer apparatus comprising, in combination: diaphragm pressure sensing means; means subjecting one side of said sensing means to a fluid pressure undergoing measurements; means subjecting the opposite side of said sensing means to a reference pressure, the latter said means comprising permanently sealed hollow coil means the interior of which is exposed to said sensing means and is filled with a reference fluid at said reference pressure; thermostatically controlled heating means for maintaining said reference fluid within said coil means at a predetermined constant temperature thereby insuring a constant reference pressure; strain sensitive elements mounted on said diaphragm sensing means; and means for indicating strain in said strain sensitive elements.

6. Highly sensitive pressure transducer apparatus comprising, in combination: diaphragm pressure sensing means; means subjecting said sensing means to a fluid pressure undergoing measurements; means also subjecting said sensing means to a reference pressure in opposition to said fluid pressure undergoing measurement, the latter said means including a fully enclosed chamber, a hollow coil within said chamber, said coil having sealed therein a reference fluid at said reference pressure, and means exposing the interior of said coil to said sensing means; automatic heater means distributed in a uniform manner in said chamber for maintaining said coil and the fluid therein at a uniform, predetermined temperature thereby insuring a constant reference pressure; strain sensitive elements mounted on said diaphragm sensing means; and means for indicating strain in said strain sensitive elements.

7. Highly sensitive pressure transducer apparatus comprising, in combination: a prestressed, integrally constructed thin diaphragm peripherally mounted; means subjecting one side of said diaphragm to a fluid pressure undergoing measurement; means subjecting the other side of said diaphragm to a reference pressure, the latter said means comprising hollow coil means the interior of which is filled with a reference fluid at said reference pressure and is exposed to said other side of said diaphragm; thermostatically controlled heating means for maintaining said reference fluid within said coil means at a predetermined constant temperature thereby insuring a constant reference pressure; strain sensitive elements mounted on one surface of said diaphragm; and means for indicating strain in said strain sensitive elements.

8. Highly sensitive pressure transducer apparatus comprising, in combination: a prestressed, integrally constructed thin diaphragm peripherally mounted; means subjecting one side of said diaphragm to a fluid pressure undergoing measurement; means subjecting the other side of said diaphragm to a reference pressure, the latter said means comprising hollow coil means the interior of which is filled with a reference fluid at said reference pressure and is exposed to said other side of said diaphragm; thermostatically controlled heating means for maintaining said reference fluid within said coil means at a predetermined constant temperature thereby insuring a constant reference pressure; strain sensitive elements mounted on one surface of said diaphragm; means for indicating strain in said strain sensitive elements; and means insulating said diaphragm against hot spots due to eddy currents in said reference fluid adjacent said diaphragm.

References Cited in the file of this patent

UNITED STATES PATENTS

| | | |
|---|---|---|
| 1,763,354 | Ileman | June 10, 1930 |
| 2,400,467 | Ruge | May 14, 1946 |
| 2,477,507 | Africano | July 26, 1949 |
| 2,580,407 | Clark | Jan. 1, 1952 |
| 2,617,305 | Dahm et al. | Nov. 11, 1952 |

FOREIGN PATENTS

| | | |
|---|---|---|
| 509,906 | Great Britain | July 24, 1939 |